UNITED STATES PATENT OFFICE.

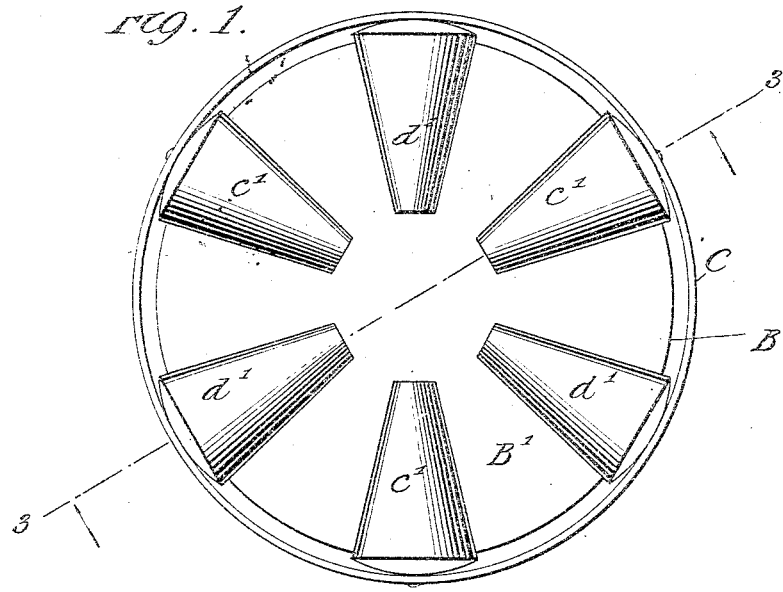
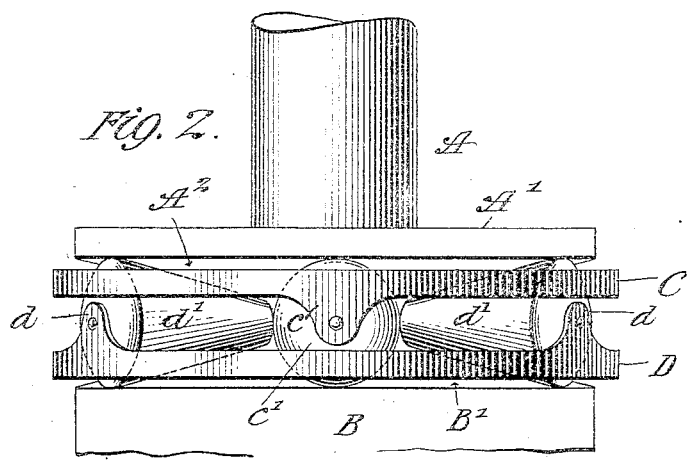
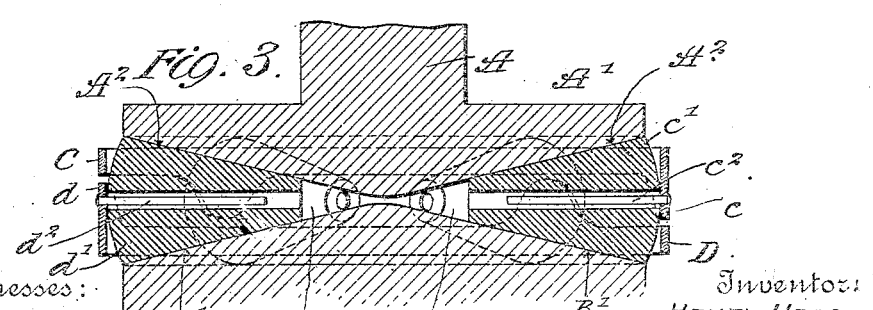

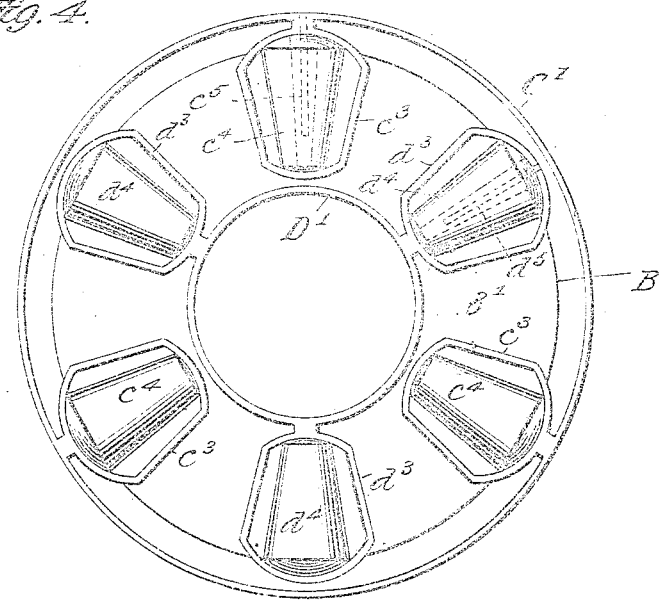
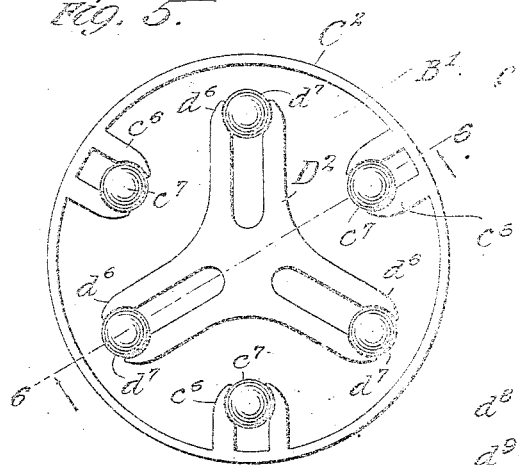
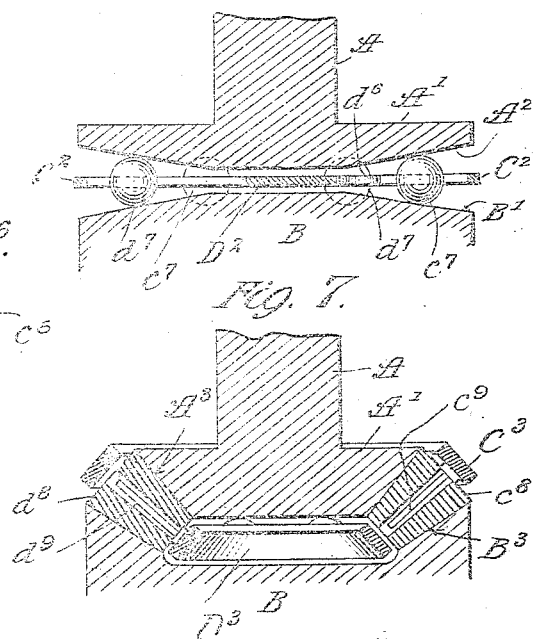

HENRY HESS, OF WAWA, PENNSYLVANIA, ASSIGNOR TO THE HESS-BRIGHT MANUFACTURING COMPANY, OF PHILADELPHIA, PENNSYLVANIA, A CORPORATION OF DELAWARE.

ANTIFRICTION-BEARING.

1,122,596.   Specification of Letters Patent.   Patented Dec. 29, 1914.

Application filed July 16, 1907. Serial No. 383,971.

*To all whom it may concern:*

Be it known that I, HENRY HESS, a citizen of the United States, residing at Wawa, in the county of Delaware and State of Pennsylvania, have invented certain new and useful Improvements in Antifriction-Bearings, of which the following is a specification, reference being had therein to the accompanying drawings.

My invention relates to anti-friction bearings, and more particularly to that class thereof designed to reduce by self adjustment the frictional wear and to divide properly the pressure upon the parts.

It is known in the art that in bearings of this type the elements thereof will adjust themselves to the path of least resistance, thereby dividing the load and at the same time within limits correcting the errors and inaccuracies existing in the parts themselves. However carefully designed and made, it is rarely possible to secure the exactness essential for perfect theoretical operation, and again, the use and wear of the bearings frequently cause or exaggerate the errors and inaccuracies mentioned. Thus for instance, the rollers or balls may be of unequal diameter, or irregular in form, or otherwise untrue. Again, there may be a lack of parallelism between the various zones on the raceways or an eccentric running of one raceway with reference to the other, or a relatively wabbling motion thereof. These and other defects would cause an imperfect operation of the bearings, were it not for the fact that, as before mentioned, the rollers, balls, or the like, by a process of self-adjustment, automatically seek the path of least resistance, divide the load, and to some extent obviate the difficulties mentioned. Such bearing elements are ordinarily confined and restrained by a frame or cage, to which they are connected, in order to hold them in place.

It is the chief purpose of my invention to divide the load even further and proportionately to increase this capacity for self-adjustment, and to these ends, instead of a single cage or frame with its connected elements, I propose to employ a plurality thereof, which not only enables a considerably greater load to be supported but also apportions it among a correspondingly larger number of balls, rollers, etc.

The particular embodiment of the invention herein shown and described is an end thrust bearing, but as will hereafter appear, the same principles are equally applicable to a bearing wherein the radial pressure predominates.

Referring to the drawings: Figure 1 is a top view of a bearing, embodying my invention, the upper or supporting part being removed. Fig. 2 is a side perspective view thereof. Fig. 3 is a vertical transverse section thereof, taken substantially on the line 3—3 in Fig. 1. Fig. 4 is a view, similar to Fig. 1, showing a modified form of the cages or frames. Fig. 5 is a view, similar to Fig. 1, showing the use of balls instead of rollers. Fig. 6 is a vertical transverse section thereof, taken substantially on the line 6—6 in Fig. 5. Fig. 7 is a sectional view, similar to Fig. 3, showing another modified arrangement.

For purposes of illustration, I have shown only two cages or frames herein, and each is provided with three rollers or balls, arranged at angles of 120°, this latter being my preferred form, as the three balls or rollers not only equally support the end-thrust but also take up the internal thrust as well, and for the purposes mentioned, the number of parts is thus reduced to a minimum.

Referring to Figs. 1, 2, and 3, the shaft A is fixed upon the upper casing member or supporting part $A^1$, and the entire bearing is mounted upon the lower casing member or supporting part B. The upper part $A^1$ is formed with a downwardly projecting conical surface $A^2$, and the lower part B is similarly formed with an upwardly projecting conical surface $B^1$. Between these conical surfaces $A^2$ and $B^1$, the rolling elements or conical rollers $c^1$, $c^1$, $c^1$, and $d^1$, $d^1$, $d^1$, are mounted in the customary manner. However, it will be noted that the rollers $c^1$, $c^1$, $c^1$, are connected together and held in place by reason of their attachment at $c$, $c$, $c$, to the cage or frame C, and similarly that the rollers $d^1$, $d^1$, $d^1$, are attached at $d$, $d$, $d$, to the frame D. The frames C and D are entirely separate and distinct from each other, and hence the rollers connected thereto are capable of independent self-adjustment in the manner previously described, but with the added function of dividing the load still further and decreasing the liability to wear. In Fig. 3, a roller $d^1$ is illustrated as mounted upon a spindle $d^2$ projecting from the frame D, and a roller $c^1$ as mounted upon a spindle $c^2$ projecting from frame C. The clearance between the respective rollers and spindles is shown in exaggerated form to indicate the capability of longitudinal and skewing motion in the rollers to permit of their adjusting themselves to inequalities, etc.

In Figs. 1, 2, and 3, the cages C and D are both in the form of rings arranged externally to the elements connected thereto.

In Fig. 4, I show a somewhat different arrangement, wherein, however, the parts operate in the manner previously described. The frame or ring $D^1$ is interiorly located, and provided with projecting loops $d^3$, $d^3$, $d^3$, within which are placed the rollers, $d^4$, $d^4$, $d^4$, mounted on inwardly projecting spindles $d^5$, $d^5$, $d^5$, connected to the said loops. And the ring C is exteriorly located and formed with interiorly projecting loops, $c^3$, $c^3$, $c^3$, and spindles, $c^5$, $c^5$, $c^5$, whereby the rollers $c^4$, $c^4$, $c^4$, are carried. One at each set of spindles $c^5$, $c^5$, $c^5$, and $d^5$, $d^5$, $d^5$, are illustrated in this view in dotted lines.

In Figs. 5 and 6, I illustrate the application of my invention to balls instead of rollers, the parts being arranged to secure the same functions and results as previously described. The series of balls $d^7$, $d^7$, $d^7$, are held in place and loosely connected to the projecting arms $d^6$, $d^6$, $d^6$, of the interior cage or frame $D^2$, and the series of balls $c^7$, $c^7$, $c^7$, are held in place and loosely connected to the inner arms $c^6$, $c^6$, $c^6$, of the outer cage or ring $C^2$.

As stated the several balls are loosely connected to their respective arms, and by this I mean that they are permitted sufficient play with respect thereto to allow the self-adjustment previously described. In other words, in this modification the retaining recesses in the arms are of slightly greater diameter than that of the balls, and as the difference mentioned need be very small, it is shown in Fig. 5 only conventionally.

In Fig. 7, rollers are again shown, but the inner surface $A^3$ of the part $A^1$ is more steeply inclined than in Fig. 3, and the surface $B^3$ of the part B is concavely disposed, thus inclining the axes of the rollers at a vertical angle to each other, instead of their being in a horizontal plane, as before. In this form, the rollers, $d^3$, etc., are mounted upon projecting spindles $d^9$, etc., on the inner ring $D^3$, and the rollers $c^8$, etc., upon inwardly projecting spindles $c^9$, etc., on the outer ring $C^3$. These and many other variations I regard as comprised within the spirit of my invention. Thus, the form of the casing members or supporting parts, the number and form of the frames or cages employed, the number of balls or rollers connected thereto, as well as other parts, may be altered and yet still be embraced within my invention, which in its broad terms is the use of a plurality of sets of bearing members, each set being independent and its members capable of self-adjustment, for the purpose previously set forth.

In Figs. 1 to 6, my invention is shown as applied to a thrust bearing, namely one in which the load is borne longitudinally of the shaft. It will be obvious, however, that the same principles are equally applicable to the ordinary radial bearing, wherein the load is supported transversely to the shaft, and also to bearings wherein the resistance is both radial and longitudinal. Attention is directed to Fig. 7, as illustrating a bearing of the class last described, wherein due to the angular arrangement of the elements, they are able to offer resistance not only to longitudinal thrust but also to some extent to radial pressure as well. It is therefore apparent that a mere change in the angle of the members renders the bearing capable of supporting both longitudinal and radial pressure and that the nature of the thrust depends upon the angle. In other words, the different forms merge into and pass from one to another by insensible graduations.

My claims therefore are to be construed as covering all forms of anti-friction bearings, whether thrust or otherwise, wherein the same principles of operation may be applied, as it will be found in many instances that the difference between the various types is not one of kind but simply of degree. In other words, I desire it to be distinctly understood that I do not limit myself to any specific form or embodiment except in so far as such limitations are specified in the claims.

As before set forth, in all of the several forms I have shown two cages or frames each provided with three rolling elements arranged at angles of 120°, this being the preferred type and the one best adapted to take the thrust and the internal pressures as well, and to reduce the number of parts to a minimum. By employing a second set of similar form I double the carrying capacity of the bearing and distribute the load between them. Similarly I obtain the advantages arising from the capacity for self-adjustment among the individual rolling elements of both sets. And still further, I secure the flexibility proceeding from the possibility of relative adjustment between the two sets, each taken as a whole; thus if for any reason one set be accidentally retarded with reference to the other, the opportunity is afforded for relative circumferential adjustment of the sets themselves, apart from and in addition to the self-adjustment of their individual elements before described. Obviously the same advantages will inhere in and increase with the further multiplication of sets in the same manner as set forth. At this point it may be noted also that there is a decided advantage involved in connecting the rolling elements to frames or cages which tend to control and hold them in substantially normal relations and at the same time permit the limited self-adjustment of the individual elements. Without such general control, the elements frequently become displaced and a loss of efficiency or in some instances the destruction of the bearing results.

Having thus described my invention, what I claim and desire to secure by Letters-Patent of the United States is as follows.

1. In an antifriction bearing, the combination of opposed casing members forming a raceway between them, a plurality of spacing cages in said raceway wholly disconnected from and independent of each other, and a series of rolling elements mounted in each cage and separated from each other, the said cages and rolling elements being so disposed relatively that the cages may shift relatively to different load carrying positions, and the rolling elements in the respective cages will pursue a common circumferential path of travel in the raceway.

2. In an antifriction bearing, the combination of opposed casing members forming a raceway between them, a plurality of spacing cages in said raceway wholly disconnected from and independent of each other, a series of rolling elements mounted in each cage and separated from each other and movable in their respective cages bodily to different angular positions relatively to each other, the said cages and rolling elements being so disposed relatively that the cages may shift to different load carrying positions, and the rolling elements in the respective cages will pursue a common circumferential path of travel in the raceway.

3. In an antifriction bearing, the combination of opposed casing members forming a raceway between them, a plurality of spacing cages in said raceway wholly disconnected from and independent of each other, three rolling elements mounted in each cage and separated from each other, the said cages and rolling elements being so disposed relatively that the cages may shift relatively to different load carrying positions, and the rolling elements will pursue a common circumferential path of travel in the raceway.

In testimony whereof I have affixed my signature in presence of two witnesses.

HENRY HESS.

Witnesses:
  NETTIE L. HAHN,
  CLARA E. KENNEDY.